Nov. 10, 1959 R. E. MAURER 2,912,325
LIGHT-SENSITIVE FILM PRESCREENED BY HERSCHEL EXPOSURE
Filed Feb. 12, 1954 3 Sheets-Sheet 1

RICHARD E. MAURER
INVENTOR.

BY

ATTORNEYS

Nov. 10, 1959 R. E. MAURER 2,912,325
LIGHT-SENSITIVE FILM PRESCREENED BY HERSCHEL EXPOSURE
Filed Feb. 12, 1954 3 Sheets-Sheet 2

RICHARD E. MAURER
INVENTOR.

BY

ATTORNEYS

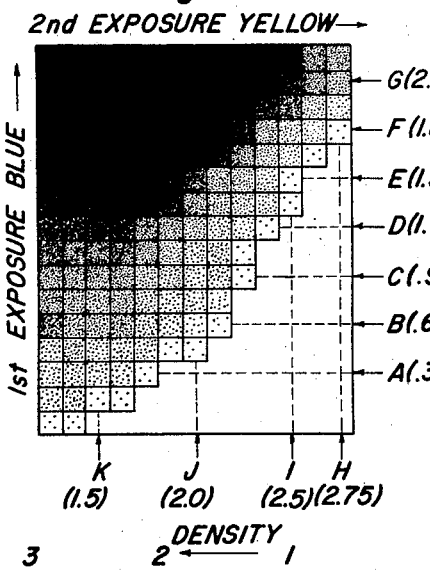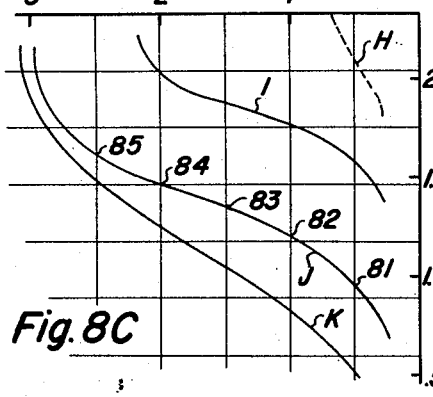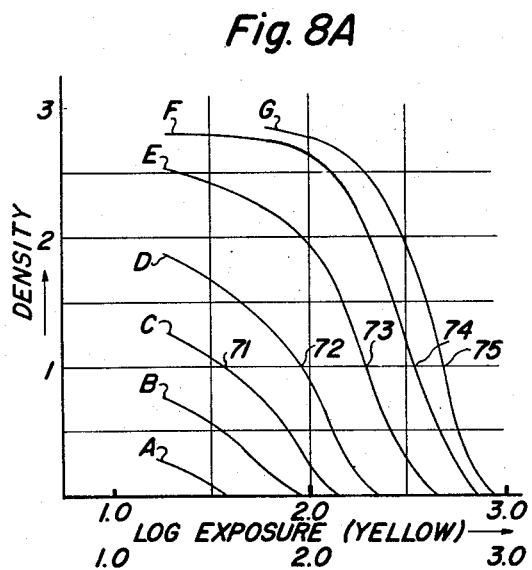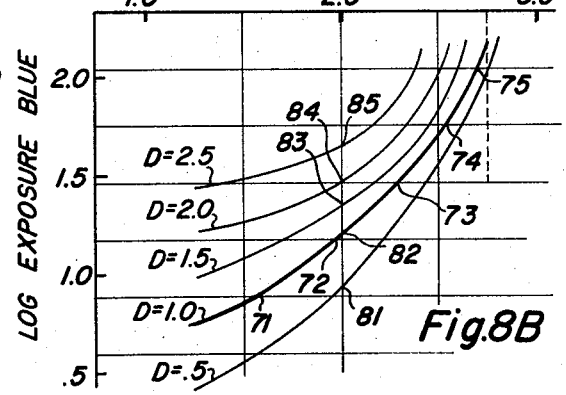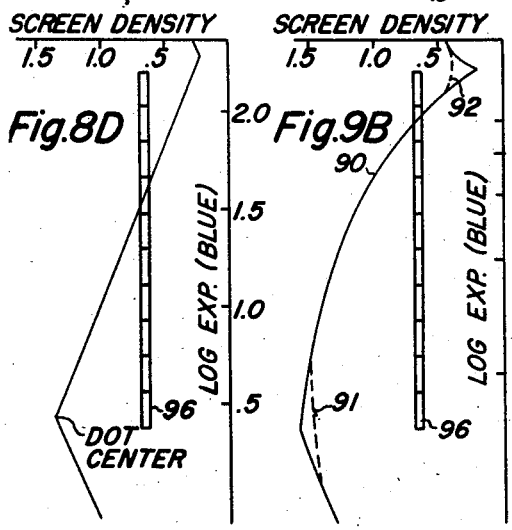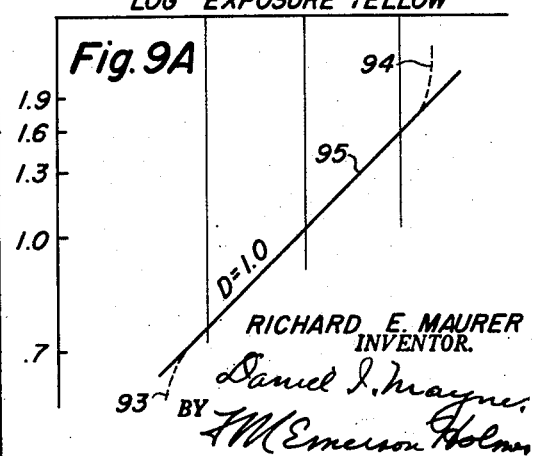

United States Patent Office 2,912,325
Patented Nov. 10, 1959

2,912,325

LIGHT-SENSITIVE FILM PRESCREENED BY HERSCHEL EXPOSURE

Richard E. Maurer, Rochester, N.Y., assignor to Eastman Kodak Company, Rochester, N.Y., a corporation of New Jersey Application February 12, 1954, Serial No. 409,923

6 Claims. (Cl. 96—79)

This invention relates to halftone processes and is directed particularly to prescreened photographic material which on exposure to a continuous tone image results in a halftone record.

It is the object of the invention to provide the screening necessary for halftone reproduction work. A special object of certain embodiments of the invention is to provide prescreened photographic material for the making of halftone positives or negatives directly.

It is the object of the preferred form of the invention to provide a prescreened material which gives a halftone positive instead of a negative upon ordinary development following exposure to a continuous tone positive.

Herschel effect

The Herschel effect dates back to 1839 and is a phenomenon quite well known in the photographic field. A fairly comprehensive discussion of the effect is given on pages 277–289 of "The Theory of the Photographic Process," by C. E. Kenneth Mees, published by the Macmillan Company, New York, 1942. As pointed out in that text, the degree of sensitivity to the Herschel effect varies somewhat from one photographic material to the next but a large number of materials are known which show the Herschel effect.

Generally speaking any photosensitive material is said to be Herschel-sensitive if a latent image formed therein by short wavelength exposure can be reduced in intensity by a subsequent longer wavelength exposure. Although Herschel effect is known to extend over into the solarization part of the characteristic photographic reproduction curve, the present invention is concerned primarily with the Herschel reduction of density whether the density is produced by exposure of a negative material or by the prefogging used in making certain forms of direct positive materials. For example, U.S. Patent 2,541,472 Kendall et al. describes a direct positive material which is prefogged and which depends on the Herschel effect for reduction of density by subsequent exposure to yellow light. The material described in the Kendall patent is particularly Herschel-sensitive, but the present invention is not limited to such materials nor is it limited to direct positive materials. Herschel sensitivity involves two factors, the amount of reduction of latent image which can be produced by long wavelength exposure and the amount of such exposure which is required to give a specified amount of reduction.

Herschel-sensitive materials include two types: Those which have not been exposed and those which have been preexposed or otherwise pretreated to have a latent image corresponding to a high density. The term prefogged Herschel materials as used in this specification refers only to such preexposed Herschel-sensitive material and not to other photosensitive materials which may give a positive directly. Thus Herschel-sensitive material when preexposed uniformly to short wave length radiation, e.g., to blue light, contains a latent image and the material is prefogged Herschel material. This latent image can be reduced and a direct positive obtained by a subsequent exposure to long wavelength radiation. The dividing line between what constitutes short wavelength image producing radiation and what constitutes long wavelength image destroying radiation depends on the particular emulsion, but blue on the one hand and yellow or red light or even infrared on the other represent the usual, typical, and best known cases.

Thus the term "long wave length Herschel exposure" as used in this specification shall have the commonly accepted meaning covering the long wave length end of the visible spectrum and the near infra red. The term "short wave length image producing radiation" shall also have the usual meaning including the near ultra-violet and blue regions of the spectrum and for panchromatic emulsions including the additional parts of the visible spectrum to which the particular emulsion has been sensitized.

Prescreening

A prescreened photographic material is one in which the emulsion speed varies in the form of a dot pattern. When subsequently exposed to an optical image, the most sensitive points are affected first, and with further exposure the effect spreads to less sensitive parts of the emulsion so that a dot pattern is produced, resulting in a halftone negative or positive.

The emulsion speed may, for example, be determined by the exposure required to produce a density of 1.0. In Herschel-sensitive emulsions, which have been partially fogged by short wavelength radiation, the speed (when the formation of a positive image is involved) can be decreased by further (non-image) exposure to short wavelength radiation or increased by non-image exposure to long wave-length radiation. Various combinations of such exposures are employed in the various embodiments of the present invention in order to provide the required speed differentiation across the dots. That is, starting with some uniform sensitivity, the speed at the centers of the dots may be increased by long wavelength radiation or alternatively the speed at the corners of the dots may be decreased by short wavelength radiation or a combination of both screening exposures may be given. The speed increase due to long-wavelength radiation is the less useful of the two because it has less sensitivity range and beyond a certain point, it lowers the contrast of the emulsion and also the screening exposure becomes quite critical. This is usually the case when both exposures are of the same type and act in the same direction, i.e., when both prescreening and image exposures are blue or when both are yellow. The poor contrast and the criticalness are found to be a consequence of the fact that such exposures are usually additive in effect.

For those who like to chart all possibilities, it is noted that the screening exposure may be short or long wavelength, or a combination of the two, and the image exposure may also be either short or long wavelength, and the screening may be before or after the image exposure. The use of screening exposures after the image exposure, although often useful, is not prescreening, and the use of short wavelength for both exposures is not Herschel effect, so these procedures are not of direct interest here. I have found that the use of long wavelength screening followed by short wavelength image exposure produces relatively poor dot sharpness and not much sensitivity range. The use of the same type of exposure for screening and image is useable under certain conditions but as already explained, it has disadvantages. This leaves, as the most preferred forms, short wavelength (or combination short and long wavelength) prescreening followed by long wavelength image exposure, giving a direct positive.

A simple but preferred embodiment of the invention is a Herschel-sensitive material exposed to short wavelength radiation through a halftone screen. This has the advantage that the short wavelength exposure produces a wide range of sensitivity which in turn provides a long-scale prescreened film, at the same time maintaining good contrast so that the dots are sharp. A further advantage is that sensitivity varies smoothly in accordance with the short-wavelength exposure given so that the screening exposure is not too critical.

The second embodiment does not have as wide a range of sensitivity and is more critical to manufacture but on the other hand it is convenient for use with prefogged Herschel material such as that marketed under the trade name Autopositive which has already been given a uniform short wavelength exposure. In this second embodiment, the film, already fogged with short wavelength radiation, is prescreened by exposure to long wavelength light through a screen. In using the film, a long wavelength image exposure is given, producing a direct positive halftone image. In this case the screening exposure which, as already explained, is intended to produce the required sensitivity variation, is of the same type as the image exposure, i.e., both are long wavelength exposures. I have found that when one exposure is used to control the sensitivity of the emulsion to a second exposure of the same type, only a relatively limited change of sensitivity can be accomplished. Beyond this point, the emulsion contrast and hence the dot quality is lowered and accordingly the amount of sensitizing exposure required becomes very critical. This is not a serious disadvantage in one variation of the invention in which the screening is done through a screen consisting of a nonvignetted screen, i.e., one with sharp dots known as a halftone tint. In this case the prescreened film contains only two main levels of sensitivity—i.e., the less sensitive areas which have not received the screening exposure and the areas in which the latent image is partially destroyed and the sensitivity increased by the screening exposure. Such a material will tend to produce a so-called "Posterized" picture consisting of three tones only, when printed onto a very high contrast material such as a photo-mechanical printing plate coating. On a lower contrast material, a full range of tones is produced, and the screening has the effect of lowering the contrast.

With either embodiment, the tone characteristics of the prescreened film depend on the nature of the screen, the amount of prescreening and any uniform blue or yellow flash given without the screen. These effects are discussed further below in connection with the drawings.

In a third form of the present invention a combination effect is obtained by using a two-color screen of halftone dots in which the areas for exposing the dot centers of the Herschel-sensitive material transmit blue and the areas for exposing the dot corners transmit yellow or red. Exposure of the center of each dot tends to enhance the latent image in prefogged Herschel materials whereas the yellow areas produce a fading of the latent image at the corners due to the Herschel effect.

In all three embodiments the prescreened material is a Herschel sensitive silver halide emulsion containing a latent image distributed over the layer in a halftone pattern. The latent image is due to short wavelength radiation, which has been provided primarily during the screening exposure in the first embodiment or during the prefog exposure in the second embodiment or by both of these exposures in the third form of the invention. Except in the special case of the posterizing variation of the second embodiment, the halftone pattern is an undulating one. The preferred embodiments, therefore, have an undulating halftone pattern.

One convenient method of producing the first embodiment of the invention starts with prefogged Herschel material, giving it a uniform long wavelength Herschel exposure to remove the latent image substantially completely. The material is then equivalent to unexposed Herschel sensitive material. A short wavelength screening exposure is then given. The resulting prescreened material is effectively identical with species one and is considered a form of species one, but in common with species two, the areas between the dots (i.e., the corners) have been faded by long wavelength exposure.

The screen used for prescreening may be a ruled screen out of contact or a contact screen having undulating density held in contact with the photographic material to be screened. In the special posterizing case of the second embodiment, the screen may be a tint which is a form of contact screen with high dot contrast.

It is noted that prescreened materials produced by the above discussed methods differ from that described in U.S. Patent 2,102,021 Murray by the fact of Herschel sensitivity. Also, the Murray film provides a separate unexposed layer or level within the emulsion for receiving the ultimate copy image whereas the present invention must give both exposures to the same emulsion, in general by prescreening right through the emulsion layer. Furthermore, the method of using these prescreened materials is quite different from that described in the Murray patent. The Murray system always results in the combination of a screen and a continuous tone image rather than a single image broken up into a screen pattern. An effect somewhat similar to the Murray system, although not in useful form, could be obtained with some forms of the present prescreened materials if a continuous tone image exposure were made by blue light. However, both the Murray system and blue image exposure of the present prescreened materials result in high density records with inferior dot quality and, of course, the special advantage of a prescreened film according to the present invention is that exposure to a long wavelength image produces a halftone record, not a continuous tone record plus a screen. Furthermore, this halftone record is a direct positive, not a negative.

Also, the preferred embodiment of the present invention in which the prescreening exposure is in the opposite direction to the ultimate image exposure, even further counteracts these inherent shortcomings of the prior system. In the prior system the quality of the individual dots is poor. That is, the contrast at the edge of the dot is low.

In the present invention, on the other hand, the sharpness of the individual dots is high and is more or less independent of the distribution of exposure across the dot. Thus the simple change to Herschel sensitive material results in a material entirely different from that of Murray.

The full explanation of this important advantage is not simple. The dot size (for any given image exposure) depends on the amount of latent image, which is determined by the amount of blue prescreening at each point of the dot, but the sharpness of the dot depends on the contrast or gamma to yellow bleaching exposure. This alleviates the well-know conflict that high image contrast requires a low contrast screen whereas good dot sharpness requires a high contrast screen. Whenever the screening exposure and the subsequent image exposure are in the same direction, as in U.S. Patent 2,102,021, Murray, the dot sharpness depends directly on the same factors which control image contrast and is reduced whenever high contrast images are desired. In the preferred embodiment of the present invention, however, the screening exposure creates a latent image and the ultimate image exposure to yellow light bleaches it so that the exposures are in the opposite direction.

Another advantage of blue prescreened Herschel-sensitive material over blue prescreened non-Herschel-sensitive material is that it can be used with an image exposure which acts in the opposite direction and hence has all of the advantages discussed above, namely long range, better dot sharpness and less critical screening exposure.

All of the above embodiments of the invention result in a prescreened material, i.e., one in which the screening is obtained in advance and the ultimate exposure to a continuous tone image does not require any separate screen. Such prescreening systems have many advantages. However, there are some advantages to be gained in the use of the Herschel effect in halftone work even when prescreening itself is not involved. That is, there are some advantages in systems in which the image exposure is given before the screen exposure.

For example, one may start with an ordinary negative material which is Herschel sensitive, produce a latent image exposure thereon by short wavelength radiation (e.g., blue) and then expose through a screen to long wavelength radiation such as red or yellow light. This produces a halftone negative from a continuous tone positive image. Still another system which gives useful results is one in which the Herschel sensitive film is first fully exposed by blue light or otherwise to an overall fogging exposure. At this stage the material is prefogged Herschel material. A continuous tone image exposure is then made by red or yellow light. This is followed by a third uniform exposure through a screen with red or yellow light, which produces a halftone positive from a continuous tone positive.

Since any Herschel-sensitive film will work for the present invention and since prefogged Herschel materials of this type available on the market are highly Herschel-sensitive, the following example of the first embodiment is given using standard Kodagraph Autopositive Film. The existing latent image is bleached with a yellow filter using an R-2 photoflood lamp at one foot and a 2-minute exposure. A white-light exposure is then made through a contact screen in contact with the film having 150 lines per inch, the exposure being to the same lamp at the same distance for the same interval. The white light exposure is effectively a short wavelength exposure. The film is then exposed by contact printing to a continuous tone positive or negative again using an R-2 photoflood at one foot for 2 minutes wtih a yellow filter; a halftone negative results from a continuous tone negative or a halftone positive results from a continuous tone positive. The film is then processed in Kodalith developer for two minutes at 68° F. If Dektol or D-72 is used, the development should be for 1 minute at 68° F., and in this case the film is about half as fast so that the exposure should be 4 minutes instead of 2 minutes.

An example of the second embodiment starts with the same prefogged Herschel material and simply applies the yellow bleach exposure through a contact screen with the same lamp at the same distance for the same interval of time. The image exposure is then given as described above followed by the same type of development. This also gives a positive directly from a positive.

The invention will be fully understood from the following description of the preferred embodiments thereof as illustrated in the accompanying drawing in which.

Figure 6:
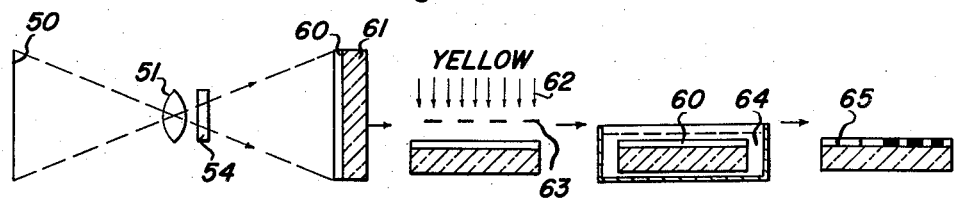

Fig. 6 similarly illustrates an alternative method for making a halftone record.

Fig. 7 shows a crossed step tablet sensitometric strip illustrating the Herschel effect.

Figs. 8A, 8B and 8C are graphs obtained from the sensitometric strip of Fig. 7.

Fig. 8D illustrates the density distribution in a contact screen giving the linearly distributed log E exposure of Fig. 8C.

Figs. 9A and 9B illustrate the computation of exposure distribution corresponding to an arbitrarily desired tonal response, and the corresponding density distribution in the contact screen.

Figure 1:
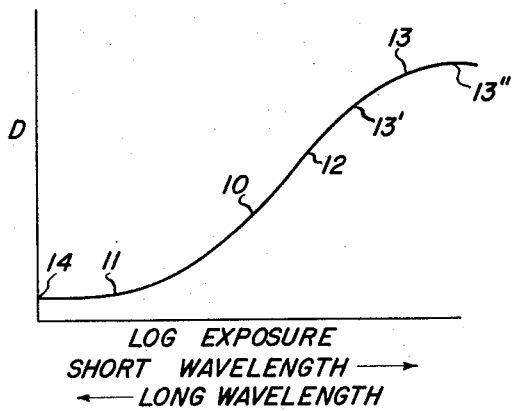
Fig. 1 is a simplified H and D characteristic curve of a photographic emulsion.

In Fig. 1 the well-known characteristic response curve of density vs. log exposure is plotted as 10. The minimum or fog density is indicated at 14. The important part of the curve is made up of a toe portion starting with a threshold 11, a straight line portion 12 and a shoulder or maximum density portion 13. Ordinary film receiving short wavelength radiation produces increased density with increased exposure, all of which is represented by a change to the right along the curve. For ease of understanding the invention in a general way, Herschel bleaching is (at first) considered as a movement or change along this curve in the opposite direction to that representing ordinary exposure. Admittedly, this is an oversimplification of the phenomenon, but allowing for the fact that the log exposure scales should be different and the curve shapes are probably not quite the same, the Herschel effect can be most easily understood from this simple curve. Herschel bleaching of the latent image by means of long wavelength radiation tends to reduce the density produced by the first exposure and hence is represented by movement to the left and down the curve 10. This oversimplified illustration is incapable of representing the improved dot sharpness discussed in detail above since this latter advantage is directly related to the fact that the curves for the bleaching exposure are not the same as the one for the density producing exposure, but Fig. 1 serves adequately as an introduction to the operation of the invention. A more precise explanation is given in the section on sensitometry in connection with Figs. 7 to 9B.

Prefogged Herschel material available on the market is substantially uniformly prefogged so that if developed without further exposure, it produces a density represented by the point 13 (for example) on the curve 10. The direct positive effect is obtained by exposing this prefogged material to yellow light, greater exposures causing a greater decrease in the density. Complete bleaching by yellow light brings the density substantially down to the point 11 on the curve. Roughly speaking, the effect on speed to yellow light in terms of white highlights (i.e., in terms of the exposure necessary to bleach to point 11) is dependent on the position of point 13. If the point 13 is low on the curve (e.g., at point 13') only a relatively small amount of bleaching exposure is required to reach the point 11. The film is fast and the scale is short. If the point 13 is high on the curve (e.g. at 13") the film is slower and the obtainable scale of densities is longer. However, for an exact discussion of the effects on speed, reference should be made to Figs. 7 to 9B.

Figure 2:
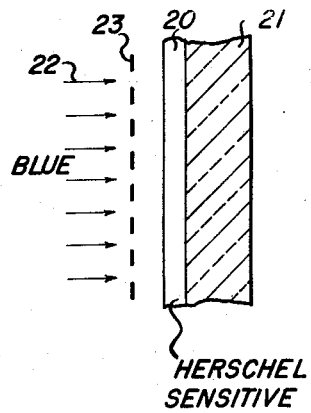
Figs. 2, 3 and 4 illustrate alternative methods of providing prescreened film according to the present invention.

One simple method of making the preferred form of prescreened material is illustrated in Fig. 2 in which a Herschel sensitive, but so far unexposed, emulsion 20 carried on a film base 21 is exposed by blue light, represented by arrows 22, through a halftone screen 23. The halftone screen is illustrated as a ruled screen out of contact with the emulsion layer 20, but an undulating contact screen (or for some purpose a halftone tint) in contact with the emulsion 20 could be used instead. The Herschel-sensitive emulsion layer 20, not having been preexposed, is represented by the point 14 on the curve 10 of Fig. 1. When the intensity and time of the exposure to the blue light 22, exceeds that represented by the point 11 on the curve, the exposed areas of the emulsion 20 start to have a latent image. The centers of the dots thus produced have a higher latent image and, therefore, a slower speed than the corners. This latent density in the centers is susceptible to bleaching by the Herschel effect as described below in connection with Fig. 5. The shadow end of the scale (i.e., point 13 of Fig. 1) has a value depending on the amount of screening exposure which thus determines the prescreened film speed. To have useful contrast in both the highlights and shadows, the exposure should be sufficient to expose the corners but not to overexpose the centers of the dots, i.e., the exposure should be between that which just produces a latent image at the corners and that which produces substantially maximum latent image at the centers.

Figure 3:
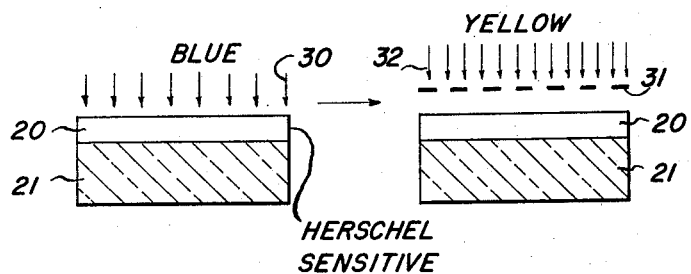

A different type of prescreened material is obtained in the manner shown in Fig. 3. In this case the same Herschel sensitive emulsion 20 receives an overall uniform fogging exposure by blue light represented by the arrows 30 which brings all of the emulsion 20 to the condition corresponding to the point 13 on the curve shown on Fig. 1. A screen 31 is then placed in front of the emulsion layer 20. Again the screen may be a ruled screen, a contact screen (or even a halftone tint). In this second example, the screen exposure is made by yellow light which bleaches the areas of the emulsion 20 which are to become the corners of the halftone dots. The yellow light is represented by arrows 32. The exposed areas become the corners in this case and care must be exercised not to overexpose during the prescreening whereas in Fig. 2 the exposed areas became the centers of the dots. It should be noted that prefogged Herschel material, as available on the market, is in the condition represented by the point 13 and hence is immediately ready for the yellow exposure illustrated in the second step of Fig. 3. Longer scale but slower effective speed is obtained by additional preflash to blue light to change the film to the condition represented by the point 13″. More usually, a shorter scale is permissible and hence for the sake of added speed the film is given a uniform preflash to yellow light to convert to the condition at point 13′ before the prescreening exposure is given. The scale also depends on the prescreening exposure.

Figure 4:
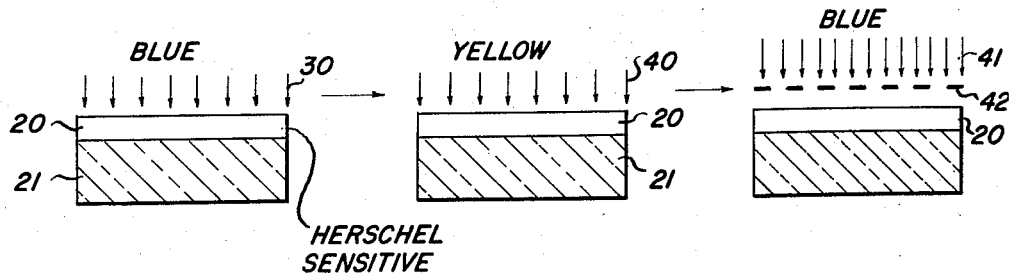

Still another method of producing prescreened film is shown in Fig. 4 in which the Herschel-sensitive film 20 first receives the blue fogging exposure so that it corresponds to standard prefogged Herschel material. Secondly, it receives an overall yellow flash represented by arrows 40 which bleaches substantially completely the prefogging exposure by the blue exposure 30. The film is then substantially in the same form as in Fig. 2 except that it has received both a blue and a yellow uniform flash. This film is then given a screened blue exposure as represented by the arrows 41 through the screen 42. It should be noted that the centers of the dots have received a blue latent image exposure and the corners of the dots have received a yellow bleaching exposure in both Figs. 3 and 4.

Figure 5:
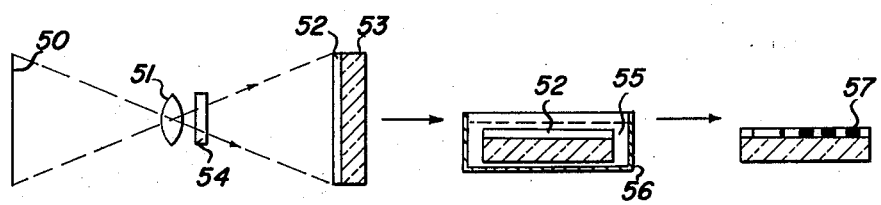
Fig. 5 is a flow chart schematically illustrating the making of a halftone record using prescreened film.

In Fig. 5 the image of a picture or copy 50 is focused by a lens 51 on a prescreened film 52 carried by a support 53, the prescreening having been produced thereon by any one of the methods illustrated in Figs. 2, 3 or 4. A yellow filter 54 ensures that the exposure is of the Herschel bleaching type. Ordinary processing of the exposed layer 52, as illustrated by a developer 55 in a tray 56, produces a halftone image 57 which is positive relative to the original picture 50.

An alternative system is shown in Fig. 6 in which the copy 50 is focused by a lens 51 through a yellow filter 54 directly on a Herschel-sensitive emulsion 60 carried by a base 61. The emulsion 60 has not been prescreened but has been preexposed to a uniform blue light. Thus a direct positive latent image is produced in the emulsion 60. This image exposure is followed by a yellow screening exposure represented by the arrows 62 and the halftone screen 63 after which the film is developed in a bath 64 and produces a halftone record 65 which is positive with respect to the original copy 50.

Alternatively the Herschel-sensitive film 60 is not preexposed and the filter 54 is replaced by a blue filter so that a negative image is produced on the film which is then screened and developed exactly as shown in Fig. 6 to result in a halftone negative rather than a halftone positive record.

Both Figs. 5 and 6 illustrate projection printing for the sake of clarity; however, with standard prefogged Herschel materials the speed is such that contact printing is more suitable.

Sensitometry

The remainder of this specification is included mainly for those interested in the mathematical analysis of the operation of the invention. Those not familiar with sensitometry can understand the invention without reference to this section. This section explains why the embodiment of the invention in which prescreening is done by short wavelength is preferable and secondly it explains how one may obtain any desired tone reproduction curve. As mentioned previously, prescreening provides a variation in speed across each dot. The distribution of this variation in speed depends on the type of screen used for the prescreening exposure. If the prescreening exposure is made through a contact screen, the exposure distribution depends on the density distribution across the dot of the contact screen. Since this density distribution may be selected almost at will, the exposure distribution during the screening exposure may have practically any desired value and accordingly the speed distribution may have practically any desired value. In the third place, this section on sensitometry is a more accurate description of the phenomenon involved than is the description relative to Fig. 1 which, for clarity, has been purposely oversimplified, all as mentioned above. On the other hand, this section on sensitometry refers only to one of the many possible representative sets of conditions and the invention is not limited thereto.

Fig. 7 is a drawing showing the actual appearance of a sensitometer strip which has been exposed by the crossed step tablet technique and processed in the usual way. The material is a Herschel-sensitive one which to start with has been given no exposure at all or if a prefogging blue exposure has been given, as in the case of autopositive film, this exposure has been removed by a uniform Herschel exposure by yellow light. Starting with such film which contains no latent image, a first exposure is given through a step tablet to blue or white light, the most dense step of the tablet being at the bottom in Fig. 7 and the least dense step being at the top. This means that the top row receives the greatest blue exposure and the bottom row or step receives the least exposure. Row A, for example, receives an exposure whose log E value is .3 and row G receives an exposure whose log E value is 2.1.

The step tablet is then rotated through 90° so that the most dense step is at the left and the least dense step is at the right. A second exposure through the step tablet is now given with yellow light which, by the Herschel effect, bleaches the image in proportion to the exposure. The column marked K receives a yellow exposure whose log E value is 1.5 and the righthand column marked H receives an exposure whose log E value is 2.75. The photographic material is then processed in a suitable developer and results in the sensitometer strip shown in which the upper lefthand corner has maximum density and the lower right corner has a minimum density.

In Fig. 8A the characteristic curves represented by rows A to G of the sensitometer strip are plotted in the usual way, density versus log exposure to yellow light. The Herschel exposure produces a direct positive and hence increasing yellow exposure produces less density. The curves are labeled to correspond to the rows of the sensitometer strip which they represent. Curve A is the characteristic curve of a material which has received a blue exposure whose log E value is .3. Curve B is the characteristic curve for a material prefogged by log $E=.6$, etc., up to curve G which is the characteristic curve for material which has been prefogged by a blue exposure whose log E value is 2.1.

Fig. 8B contains five curves plotted from the data given in Fig. 8A. These five curves correspond to horizontal lines in Fig. 8A; that is, they correspond to constant density values. For example, the curve corresponding to a density of 1.0 in Fig. 8A is labeled $D=1.0$ in Fig. 8B. The points 71 to 75 inclusive in Fig. 8A are similarly labeled in Fig. 8B. The 71 which appears on the curve C has a log E value (blue) of .9 and the point 72 has a log E value (blue) of 1.2, since the curves C and D represent these log E values of the blue exposure.

It will be noted that the curves in Fig. 8B are the isodensity contours of the step tablet shown in Fig. 7 itself.

Fig. 8C contains curves which are the characteristic curves for the columns H, I, J, and K of Fig. 7. These curves may be computed from the data in Fig. 8B. For example, starting with the curves shown in Fig. 8B and taking the points 81 to 85 inclusive along the ordinate representing a log E (yellow) value of 2.0, the curve J of Fig. 8C is plotted, the corresponding points being similarly labeled 81 to 85 in Fig. 8C. It is now easy to see how the curve 10 of Fig. 1 is oversimplified. To the extent that it is similar to curve J of Fig. 8C (turned on its side) it properly represents the response to blue exposure, but then it does not properly represent the yellow exposure since no one curve in Fig. 8A corresponds to J. Each point on curve J (which corresponds to vertical line of log $E=2.0$ in Fig. 8A) involves a different curve in Fig. 8A. Even if one curve from Fig. 8A could be superimposed on curve J (when reversed) as assumed for Fig. 1, the other curves of Fig. 8A would not fit and hence Fig. 1 would still be inaccurate.

Thus Figs. 7, 8A, 8B and 8C illustrate the regular Herschel effect by a simple cross step tablet sensitometric test and the quantitative results which are obtained thereby. So far this section on sensitometry has not been concerned with prescreening.

In prescreening according to the present invention the thing that affects dot sharpness and tone reproduction is the change in speed (i.e., the response of the emulsion to the yellow, image exposure) across the prescreened dot. The speed may be defined various ways and for the purpose of this discussion it is defined as the image exposure (in this case, yellow light) required to produce a density of 1.0.

The $D=1.0$ curve of Fig. 8B shows the relationship of blue prescreening exposure (according to the preferred embodiment) to emulsion speed, if a scale of log speed is substituted for the scale of log E (yellow).

If the log exposure (blue) is linear with respect to distance across dot from center to corner as in Fig. 8C, then curve K represents the contrast at the edge a dot for a given log E (yellow). Likewise, curve J represents the contrast at the edge of a dot for a different log E (yellow) exposure. In this case, it is evident that the dot sharpness varies throughout the scale from highlights to shadows.

The log E (blue) does not have to be linear with respect to distance across dot. The screen used in the prescreening operation can be such as to give any amount (theoretically) of log E (blue) at any point in the dot. In other words, by changing the screening conditions, we can vary over a wide range the relationship of log E (blue) to distance across dot. If this is done the contrast of K and J will be changed which means that the dot sharpness will be altered, and the two curves may become closer together or farther apart which will affect the tone reproduction.

The best shape for the speed curve will depend on the best compromise between tone reproduction and dot sharpness.

As a practical matter, the curves shown in Fig. 8C would give satisfactory results both with respect to tone reproduction and dot sharpness. Since the log E blue scale in Fig. 8C is linear, the contact screen to obtain such blue exposures would have a linear distribution of density as shown in Fig. 8D.

The density distribution in the contact screen determines the distribution of the blue screening exposure. If one desires the tonal reproduction available with a prescreened material in which the log speed distribution is linear (for example) the curve $D=1.0$ of Fig. 8B can be plotted as a straight line as shown in Fig. 9A.

In Fig. 9A the abscissae (log E yellow or log speed since one may be substituted for the other) is still plotted linearly and, therefore, the ordinates must be distorted from linear if the $D=1.0$ curve is to be a straight line 95 as shown. Fig. 9B shows the distorted log E blue scale plotted against a linear density scale giving a curve 90, which when referred to linear abscissae 96 represents the distribution of density across the dot of the contact screen used for the prescreening exposure.

In actual practice contact screens have a density distribution very similar to curve 90 except for the flattening at the centers and corners represented by broken lines 91 and 92. These affect the speed distribution curve as shown by broken lines 93 and 94 in Fig. 9A.

From any selected shape of curve 95, similar computation of the contact screen density curve 90 may be made. Also, a set of curves as in Fig. 8C can be plotted to predict the tone reproduction and dot sharpness characteristics—at least to a fair degree of accuracy neglecting the adjacency effects (light scattering, etc.) taking place within the small area of a halftone dot.

A similar set of curves can be plotted for the second species of the present invention in which the prescreening is done by a yellow exposure and the necessary dot distribution can be similarly determined. Again variations in the screening exposure will either require a different screen or will cause a variation in the response. In this second embodiment it is found that the permissible variation in screening exposure for the same tolerance in response is much less, i.e., the screening exposure is more critical than when short wavelength prescreening is used.

I claim:

1. The method of manufacturing prescreened material which comprises uniformly fogging a layer of Herschel-sensitive silver halide emulsion by exposure to short wavelength latent image-producing radiation, then exposing the layer through a halftone screen uniformly illuminated by longer wavelength image-fading radiation to produce a halftone dot latent image pattern on said emulsion with the corners of the halftone dots faded, said Herschel sensitive emulsion being one in which any and all latent images produced by blue light exposure can be substantially entirely destroyed by red and near infrared radiation.

2. A prescreened material produced by the method of claim 1.

3. The method of manufacturing prescreened material which comprises uniformly fogging a layer of Herschel-sensitive silver halide emulsion by exposure to short wavelength latent image-producing radiation, then exposing the layer through a uniformly illuminated two color screen transmitting short wavelength radiation through one of the colors in areas corresponding to the dot centers of a halftone pattern and long wavelength image-fading radiation through the other color in areas corresponding to the dot corners to produce a halftone dot latent image pattern on said emulsion with the centers of the halftone dots twice exposed to short wave length radiation and the corners of the halftone dots faded, said Herschel sensitive emulsion being one in which any and all latent images produced by blue light exposure can be substantially entirely destroyed by red and near infrared radiation.

4. A prescreened material produced by the method of claim 3.

5. The method of manufacturing prescreened material which comprises exposing a layer of Herschel-sensitive material through a halftone screen uniformly illuminated by short wavelength image-producing radiation distributed in a uniform halftone dot pattern, with an exposure between that which just produces a latent image at the least exposed corners of the screen dots and that which produces substantially maximum latent image at the most exposed centers of the screen dots, said Herschel sensitive emulsion being one in which any and all latent images produced by blue light exposures can be substantially entirely destroyed by red and near infrared radiation.

6. A prescreened material produced by the method of claim 5.

References Cited in the file of this patent

UNITED STATES PATENTS

| | | |
|---|---|---|
| 2,102,022 | Murray | Dec. 14, 1937 |
| 2,691,585 | Yule et al. | Oct. 12, 1954 |
| 2,691,586 | Yule et al. | Oct. 12, 1954 |
| 2,701,199 | Damschroder et al. | Feb. 1, 1955 |

FOREIGN PATENTS

| | | |
|---|---|---|
| 250,770 | Great Britain | Apr. 22, 1926 |